US006137699A

United States Patent [19]

Sakamoto

[11] Patent Number: 6,137,699

[45] Date of Patent: Oct. 24, 2000

[54] POWER SUPPLY PROTECTION AND CONTROL CIRCUIT

[75] Inventor: Susumu Sakamoto, Tokyo, Japan

[73] Assignee: NEC Corporation, Tokyo, Japan

[21] Appl. No.: 09/061,759

[22] Filed: Apr. 16, 1998

[30] Foreign Application Priority Data

Apr. 17, 1997 [JP] Japan .................................... 9-100333
Mar. 31, 1998 [JP] Japan .................................. 10-103625

[51] Int. Cl.[7] ........................................................ H02H 7/00

[52] U.S. Cl. ................................................ 363/50; 361/79

[58] Field of Search ................................. 363/49, 50, 55, 363/56; 323/276, 283, 284, 285, 901; 361/18, 65, 79, 90

[56] References Cited

U.S. PATENT DOCUMENTS 4,979,066 12/1990 Kawata et al. ...................... 323/276 X
5,675,481 10/1997 Erisman .................................... 363/49
5,818,670 10/1998 Ahn ........................................... 361/18
5,828,177 10/1998 Toda et al. ................................ 361/79

FOREIGN PATENT DOCUMENTS 2-124567 10/1990 Japan .
4-322314 11/1992 Japan .

*Primary Examiner*—Jessica Han
*Attorney, Agent, or Firm*—Laff, Whitesel & Saret, Ltd.; J. Warren Whitesel

[57] ABSTRACT

A power supply circuit for supplying power to an output terminal includes an overcurrent decision circuit which determines whether an output current falls into an overcurrent range. A power supply controller stops the power supply supplying the power to the output terminal when the output current falls into the overcurrent range. A computer controls the power supply controller such that the power supply is started supplying the power to the output terminal when a cause of overcurrent is canceled.

12 Claims, 6 Drawing Sheets

POWER SUPPLY PROTECTION AND CONTROL CIRCUIT

BACKGROUND OF THE INVENTION

1. Field of the Invention

The present invention generally relates to a power supply circuit and, in particular, to a protection circuit and a control method for a power supply capable of switching on and off.

2. Description of the Related Art

There has been widely used a fused circuit which concurrently does overcurrent detection and power supply interception for protection. For instance, a power supply circuit provided with a fuse for each power supply terminal and a fuse monitoring circuit has been disclosed in the Japanese Utility-model Unexamined Publication No. 2-124567. When the fuse opens, the fuse monitoring circuit notifies the computer of blowing the fuse.

Another power supply circuit has been disclosed in Japanese Patent Unexamined Publication No. 4-322314. This conventional power supply circuit is provided with an overcurrent detection circuit and a power supply interception circuit which are independently installed. When the overcurrent is detected, the power supply interception circuit automatically intercepts the power supply.

In the case of the fuse circuit, however, it is necessary to replace the burnt fuse with a new one so that the power supply may be returned. Therefore, the maintenance becomes complex. Moreover, the fuse monitoring circuit which connects the power supply line and the computer needs a buffer circuit for adjusting the voltage of the monitor signal output to the computer.

In the case of the power supply circuit which uses the overcurrent detection circuit and the power supply interception circuit, it is necessary to install an alert circuit for informing an operator of the power supply interception. Moreover, there is no description or suggestion about the return of power.

SUMMARY OF THE INVENTION

An object of the present invention is to provide a power supply circuit which can stop and start supplying power promptly and reliably.

Another object of the present invention is to provide a power supply control method which can achieve the prompt return of power after the source of overcurrent is removed.

According to an aspect of the present invention, a power supply circuit includes a controllable power supply for supplying power to an output terminal and further a first controller and a second controller. The first controller controls the controllable power supply based on an output state of the controllable power supply. The second controller controls the first controller such that the controllable power supply starts supplying the power to the output terminal.

According to another aspect of the present invention, in a control method for a power supply for supplying power to an output terminal, an output current of the power supply to detected and it is determined whether the output current falls into an overcurrent range. When the output current falls into the overcurrent range, the power supply is stopped supplying the power to the output terminal and then the power supply is started supplying the power to the output terminal when a cause of overcurrent is canceled.

DETAILED DESCRIPTION OF THE PREFERRED EMBODIMENTS

Figure 1:
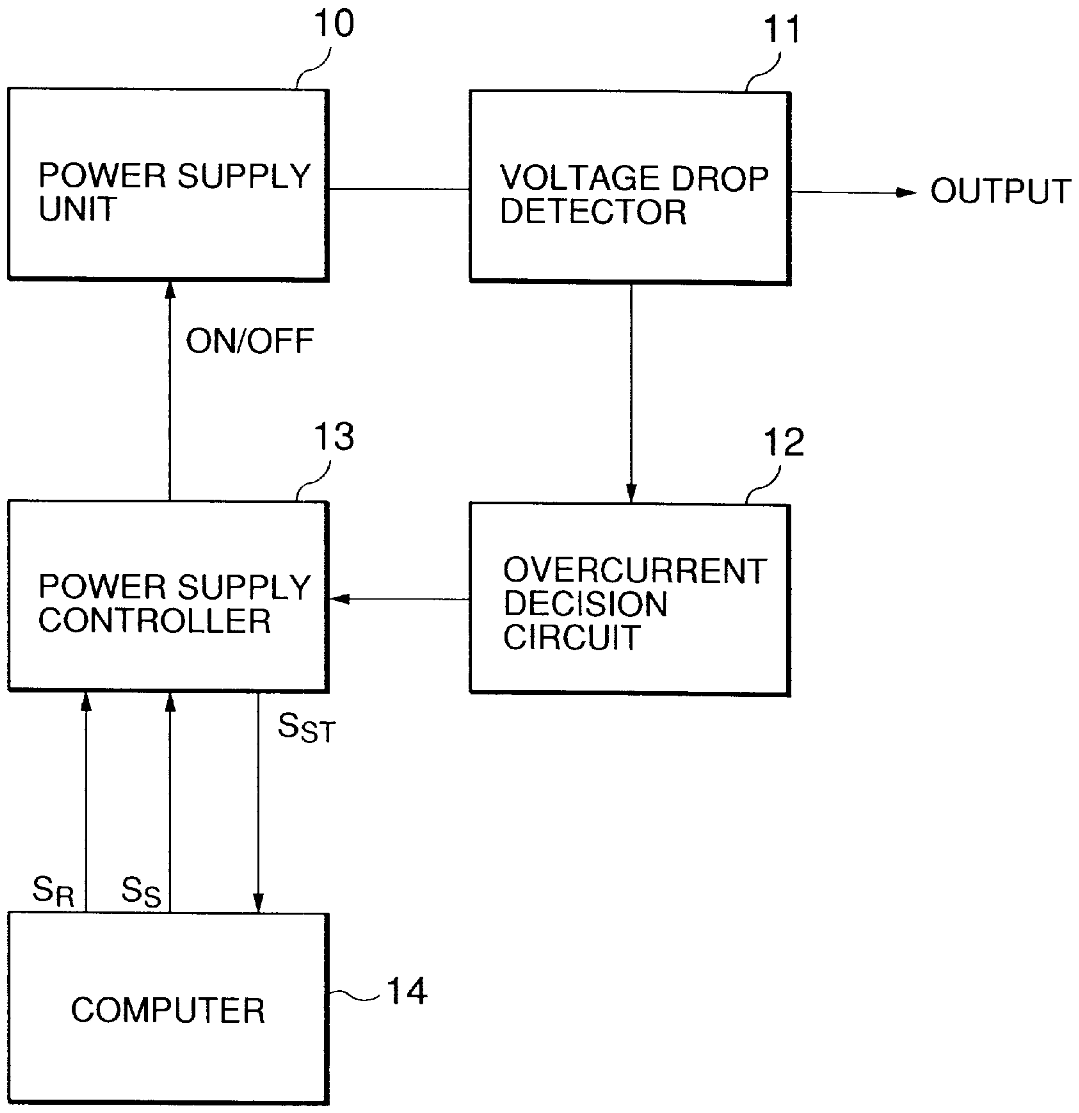
FIG. 1 is a block diagram showing the functional configuration of a power supply circuit according to the present invention.

Referring to FIG. 1, the power supply terminal of power supply unit 10 is connected to an output power line through voltage drop detector 11. A detection signal of the voltage drop detector 11 is output to overcurrent decision circuit 12 which determines whether the current of the output power line exceeds a predetermined threshold current, that is, overcurrent occurs, When the overcurrent occurs, a power supply controller 13 intercepts the power supply unit 10 to stop supplying the power depending on the decision result received from the overcurrent decision circuit 12.

The power supply circuit is further provided with a computer 14 which is connected to the power supply controller 13. The power supply controller 13 outputs a power supply state signal $S_{ST}$ to the computer 14 which uses it to monitor the output state of the power supply unit 10. Moreover, the computer 14 outputs a reset signal $S_R$ and a power supply control signal $S_S$ to the power supply controller 13. The power supply control signal $S_S$ causes the power supply controller 13 to perform the ON/OFF control such that the power supply unit 10 switches on and off. The reset signal $S_R$ causes the power supply controller 13 to compulsorily stop the power supply unit 10 from supplying the power independently of the power supply control signal $S_S$.

In the case where power is turned on or the power supply is restarted after the cause of the overcurrent is canceled, the reset signal $S_R$ and the power supply control signal $S_S$ are used to start the power supply promptly and surely as will be described later.

Figure 2:
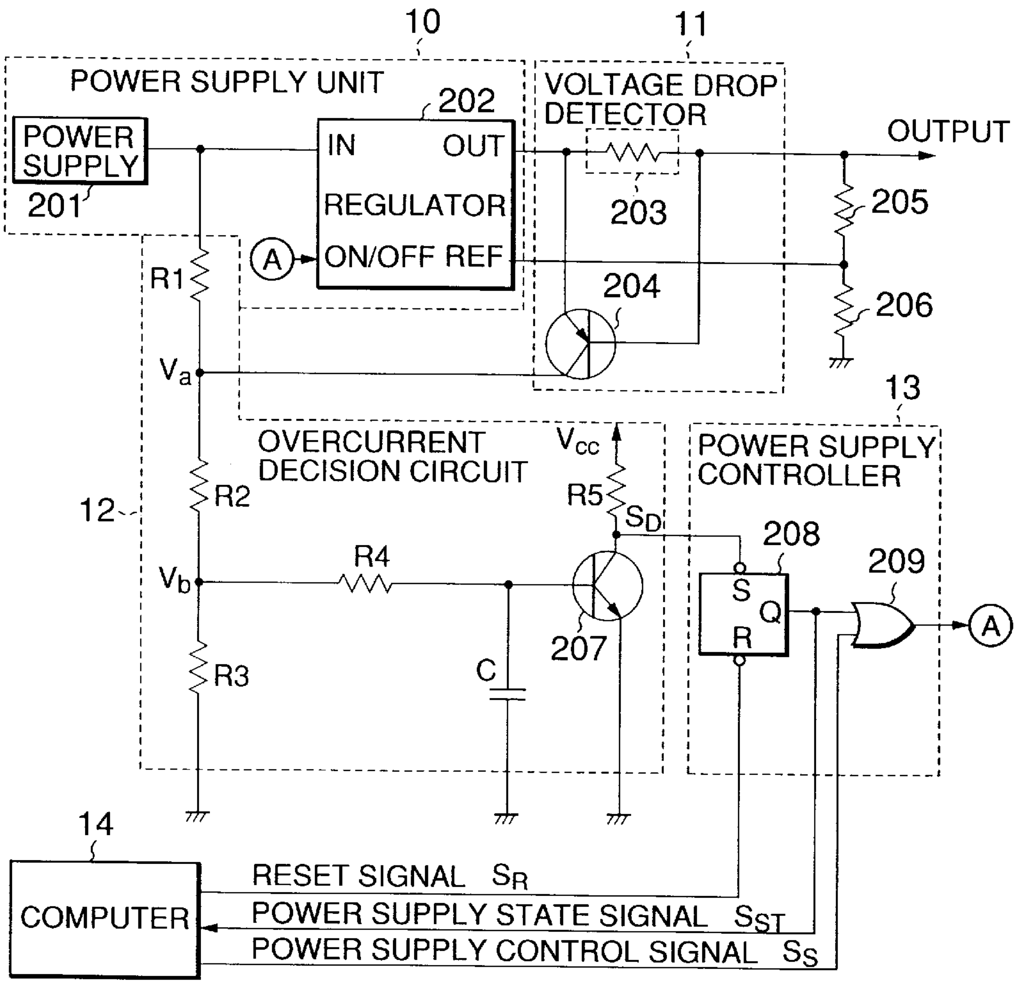
FIG. 2 is a circuit diagram showing a power supply circuit according to a first embodiment of the present invention.

Referring to FIG. 2, the power supply unit 10 is comprised of a power supply 201 and a regulator 202. The regulator 202 has five terminals: input terminal IN, output terminal OUT, control terminal ON/OFF, reference voltage terminal REF, and grounding terminal (not shown). The input terminal IN is connected to the power supply 201 and the output terminal OUT is connected to the voltage drop detector 11. The control terminal ON/OFF receives an ON/OFF control signal from the power supply controller 13. The reference voltage terminal REF receives a reference voltage generated from the output voltage of the output power line. The regulator 202 performs output control by monitoring the reference voltage and further performs the power supply ON/OFF control depending on the ON/OFF control signal received at the control terminal ON/OFF.

The voltage drop detector 11 is comprised of a resistor 203 for generating a voltage drop and a PNP transistor 204. The resistor 203 is preferably One end of the resistor 203 is connected to the output terminal OUT of the regulator 202 and the other end is connected to the output power line. The emitter of the PNP transistor 204 is connected to the one end of the resistor 203 and the base to the other end of the resistor 203.

Resistance R of the resistor 203 can be decided to the way as follows. The resistance R is obtained from the equation:

$R=V_{BE}/I_{AB}$, where $V_{BE}$ is a base-emitter activating voltage at which the PNP transistor 204 starts operating and $I_{AB}$ is a current value flowing through the resistor 203 when overcurrent occurs. In this case, the PNP transistor 204 is inactive when a normal current flows through the resistor 203 but becomes active when an abnormal current greater than $I_{AB}$ flows through the resistor 203.

The output power line on the output side of voltage drop detector 11 is grounded through two resistors 205 and 206 which are connected in series. The resistors 205 and 206 forms a voltage divider which generates the reference voltage supplied to the reference terminal REF of the regulator 202 at the tap of the resistors 205 and 206.

The overcurrent decision circuit 12 is comprised of a voltage dividing section consisting of resistors R1–R3, a resistor R4 and a capacitor C which provide a predetermined time constant, an NPN transistor 207, and a load resistor R5.

The voltage dividing section is formed with the resistors R1–R3 having sufficiently large resistance connected in series and connects the output terminal of the power supply 201 to the ground. The connection point of resistors R1 and R2 is connected to the collector of the PNP transistor 204 of the voltage drop detector 11. The other connection point of resistors R2 and R3 is connected to the base of the NPN transistor 207 through the resistor R4.

The base of the NPN transistor 207 is connected to the connection point of resistors R2 and R3 through the resistor R4 and further is grounded through the capacitor C. The emitter of the NPN transistor 207 is grounded and the collector is connected to power supply voltage Vcc through the load resistor R5.

Assuming that a voltage Va appears on the connection point of resistors R1 and R2 and a voltage Vb appears on the connection point of resistors R2 and R3, the respective resistors R1–R3 are determined so that the voltage Va becomes an active voltage of the PNP transistor 204, the voltage Vb becomes enough high to activate the NPN transistor 207 when the PNP transistor 204 is activated, and the voltage Vb becomes enough low not to activate the NPN transistor 207 when the PNP transistor 204 is inactivated. In this embodiment, they are roughly set to R1:R2:R3=100:10:1.

The power supply controller 13 is comprised of a logic circuit 208 and an OR gate 209. The logic circuit 208 has set terminal S, reset terminal R, and output terminal Q. The set terminal S is connected to the collector of the NPN transistor 207 of the overcurrent decision circuit 12. The output terminal Q is connected to an input terminal of the OR gate 209. The power supply control signal $S_S$ is received at the other input terminal of the OR gate 209. The reset signal $S_R$ is received at the reset terminal R of the logic circuit 208. Moreover, the output signal of the output terminal Q is output to the input terminal of the OR gate 209 and further is output to the computer 14 as the power supply state signal $S_{ST}$.

The logic circuit 208 is composed so that the reset signal $S_R$ received from the computer 14 may give priority more than the set signal $S_D$ received at the set terminal S. That is, the logic circuit 208 is formed so as to meet the truth table as shown in Table I, where ‘H’ and ‘L’ indicate a high voltage level and a low voltage level, respectively.

TABLE I

| SET (S) | RESET (R) | OUTPUT (Q) |
|---|---|---|
| H | H | Q |
| H | L | L |
| L | H | H |
| L | L | L |

Figure 3:
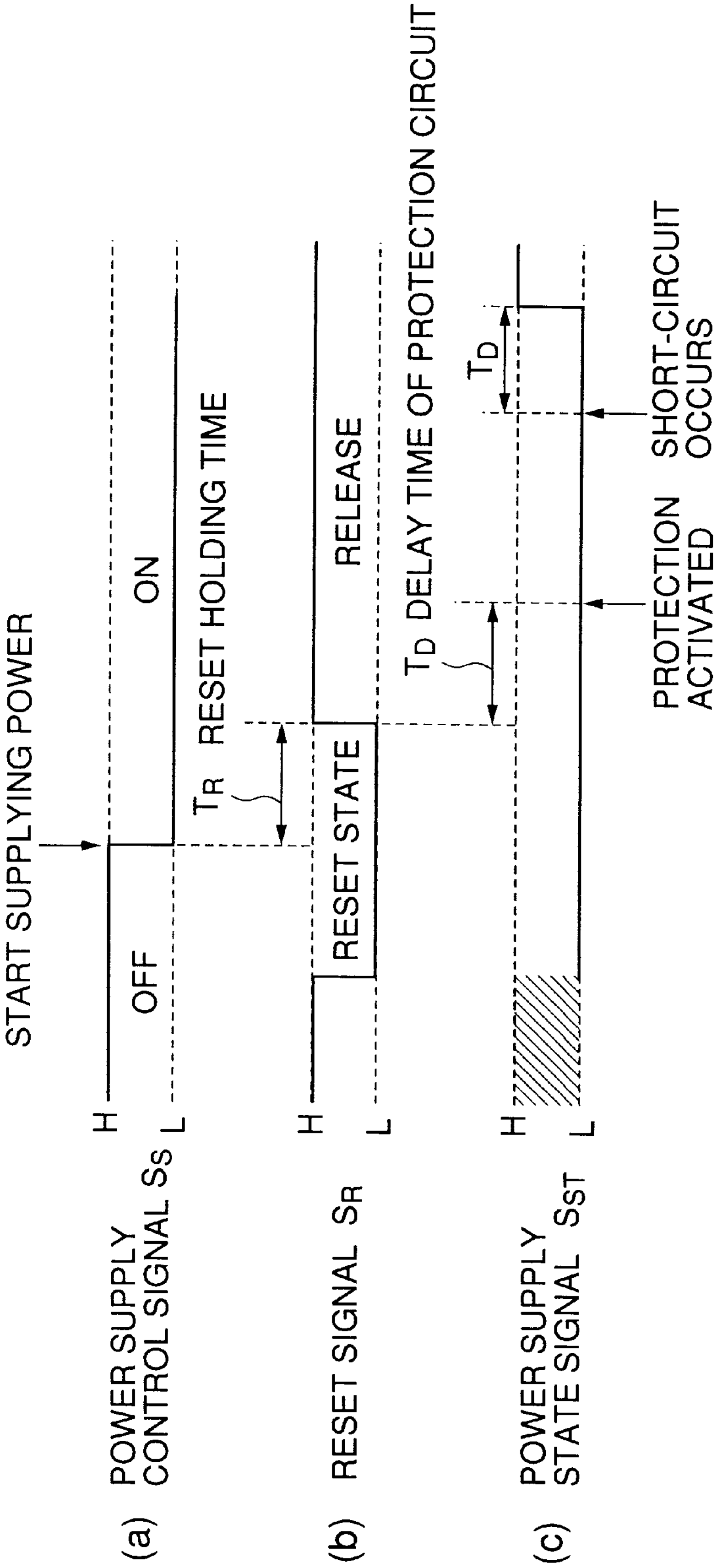
FIG. 3 is a time chart showing an operation of the first embodiment.

Referring to FIG. 3, an operation of the first embodiment will be described hereinafter. It is assumed that the regulator 202 supplies power to the output power line when receiving the ON/OFF control signal of a high voltage level (H) and stops supplying power when receiving the ON/OFF control signal of a low voltage level (L). Hereinafter, high and low voltage levels are called HIGH and LOW, respectively.

First of all, in the case where the power is turned on, as shown in b) of FIG. 3, the computer 14 sets the reset signal $S_R$ from HIGH to LOW and thereby the output Q of the logic circuit 208 is fixes at LOW as shown in Table I. Afterwards, as shown in a) of FIG. 3, the computer 14 sets the power supply control signal $S_S$ from HIGH to LOW.

When the power supply control signal $S_S$ is set to LOW, in the case of the output Q of the logic circuit 208 being LOW, the regulator 202 switches on and thereby an output current flows from the output terminal OUT of the regulator 202 to the output power line through the voltage drop detector 11. At this time, a large inrush current flows depending on the capacitance of the load connected to the output power line. The inrush current causes a voltage drop higher than the base-emitter activating voltage VBE across the resistor 203, activating the PNP transistor 204. When the PNP transistor 204 is activated, a current corresponding to the voltage generated across the resistor 203 flows in the connection point of the resistors R1 and R2, resulting in increased voltages Va and Vb.

As the voltage Vb is increased, the base voltage of the NPN transistor 207 rises according to the time constant determined from the resistor R4 and the capacitor C. After a lapse of delay time $T_D$ determined depending on the time constant, the NPN transistor 207 switches from the OFF state to the ON state. As a result, the voltage of the signal $S_D$ received at the set terminal S of the logic circuit 208 changes from HIGH to LOW. However, as described before, the output Q of the logic circuit 208 is fixed at LOW since the reset signal $S_R$ is low. Therefore, the control terminal ON/OFF of the regulator 202 remains low and thereby the output Q of the regulator 202 is not changed in any way.

In other words, the influence of the inrush current at power-on is eliminated by the computer setting the reset signal SR at LOW. Therefore, the reset holding time $T_R$ that elapsed before the reset signal $S_R$ goes high after the power is supplied may be set at the time elapsed until the current of the output power line returns to a usual current.

When the reset signal $S_R$ goes high, the base voltage of the NPN transistor 207 goes low. However, the NPN transistor 207 remains off until the delay time $T_D$ has elapsed. When the NPN transistor 207 is activated, the protection operation is started by the voltage drop detector 11, the overcurrent decision circuit 12 and the power supply controller 13. More specifically, in the case where the output current of the output power line is increasing due to some causes including short-circuit, the PNP transistor 204 operates and thereby the voltage Vb rises to the predetermined threshold level of the overcurrent decision circuit 12. And, after a lapse of the delay time $T_D$ determined by the resistor R4 and the capacitor C, the NPN transistor 207 changes from the off state to the on state.

When the NPN transistor 207 switches on, the collector voltage, that is, the signal $S_D$ changes from HIGH to LOW. As a result, the output Q of the logic circuit 208 switches to HIGH which is output to the control terminal ON/OFF of the regulator 202 through the OR gate 209. Therefore, the regulator 202 is immediately changed to the OFF state and stops supplying power to the output power line. That is, as shown in c) of FIG. 3, the protection circuit operates after a lapse of the delay time $T_D$ and stops the power-supplying.

The delay time $T_D$ prevents the NPN transistor 207 from instantaneous current variations causing the PNP transistor 204 to be activated. However, the delay time $T_D$ is desirably as short as possible within a permissible range because it slows down the response of the protection circuit. An optimal delay time $T_D$ may be set by selecting the resistor R4 and the capacitor C for each power supply circuit.

The computer 14 is informed of power interruption by monitoring the power supply state signal $S_{ST}$ which is the output Q of the logic circuit 208 and may inform an operator by display or sound. Therefore, an operator can take necessary steps for failure recovery easily and promptly.

In the case of a restart of the regulator 202 after a short-circuit's source has been canceled, the computer 14 performs power-supplying control by using the power supply control signal $S_S$ and the reset signal $S_R$ as described before.

Figure 4:
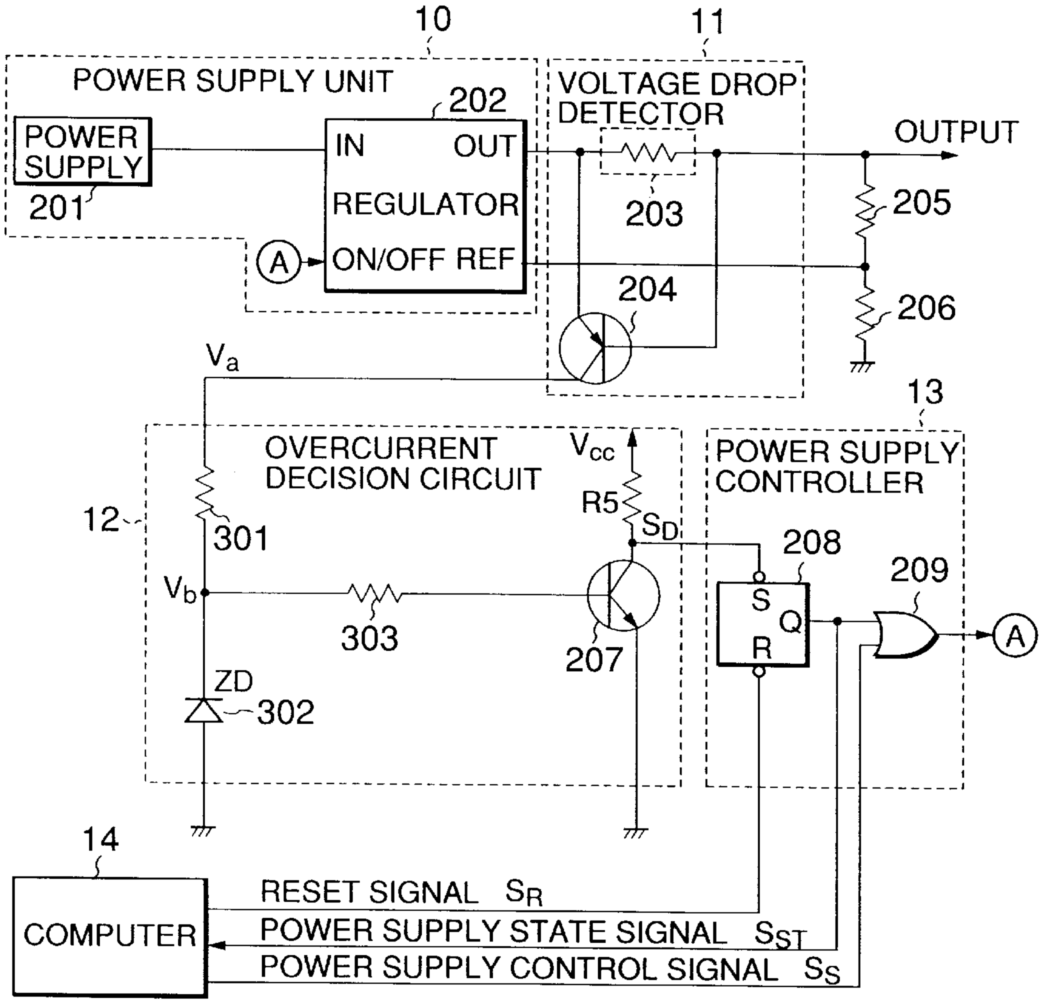
FIG. 4 is a circuit diagram showing a power supply circuit according to a second embodiment of the present invention.

Referring to FIG. 4, where circuit devices similar to those previously described with reference to FIG. 2 are denoted by the same reference numerals, the overcurrent decision circuit of the second embodiment is different from that of the first embodiment of FIG. 2.

Further, in the voltage drop detector 11 of FIG. 4, the resistance R of the resistor 203 can be decided to the way as follows. The resistance R is obtained from the equation: $R \leqq V_{BE}/I_{AB}$, where $V_{BE}$ is a base-emitter activating voltage at which the PNP transistor 204 starts operating and $I_{AB}$ is a current value flowing through the resistor 203 when overcurrent occurs.

Moreover, the overcurrent decision circuit 12 of FIG. 4 is comprised of a resistor 301, a Zener diode 302, a resistor 303, the NPN transistor 207 and the load resistor R5. The collector of the PNP transistor 204 of the voltage drop detector 11 is grounded through the resistor 301 and the Zener diode 302. In addition, the collector of the PNP transistor 204 is also connected to the base of the NPN transistor 207 through the resistors 301 and 303.

Even in the case where no short circuit occurs, a voltage Va corresponding to the output current is generated. The voltage Va is applied as it is to the base of the NPN transistor 207 unless it reaches the Zener voltage $V_{ZD}$ of the Zener diode 302. Since the base current of the NPN transistor 207 can be calculated from the voltage Va and the combined resistance of the resistors 301 and 303, the resistors 301 and 303 may be selected so that the NPN transistor 207 is not damaged or destroyed.

In the case where a short circuit causes a high voltage Va greater than the Zener voltage $V_{ZD}$, the Zener diode 302 is forced into conduction. Therefore, the NPN transistor 207 can be prevented from damage.

Figure 5:
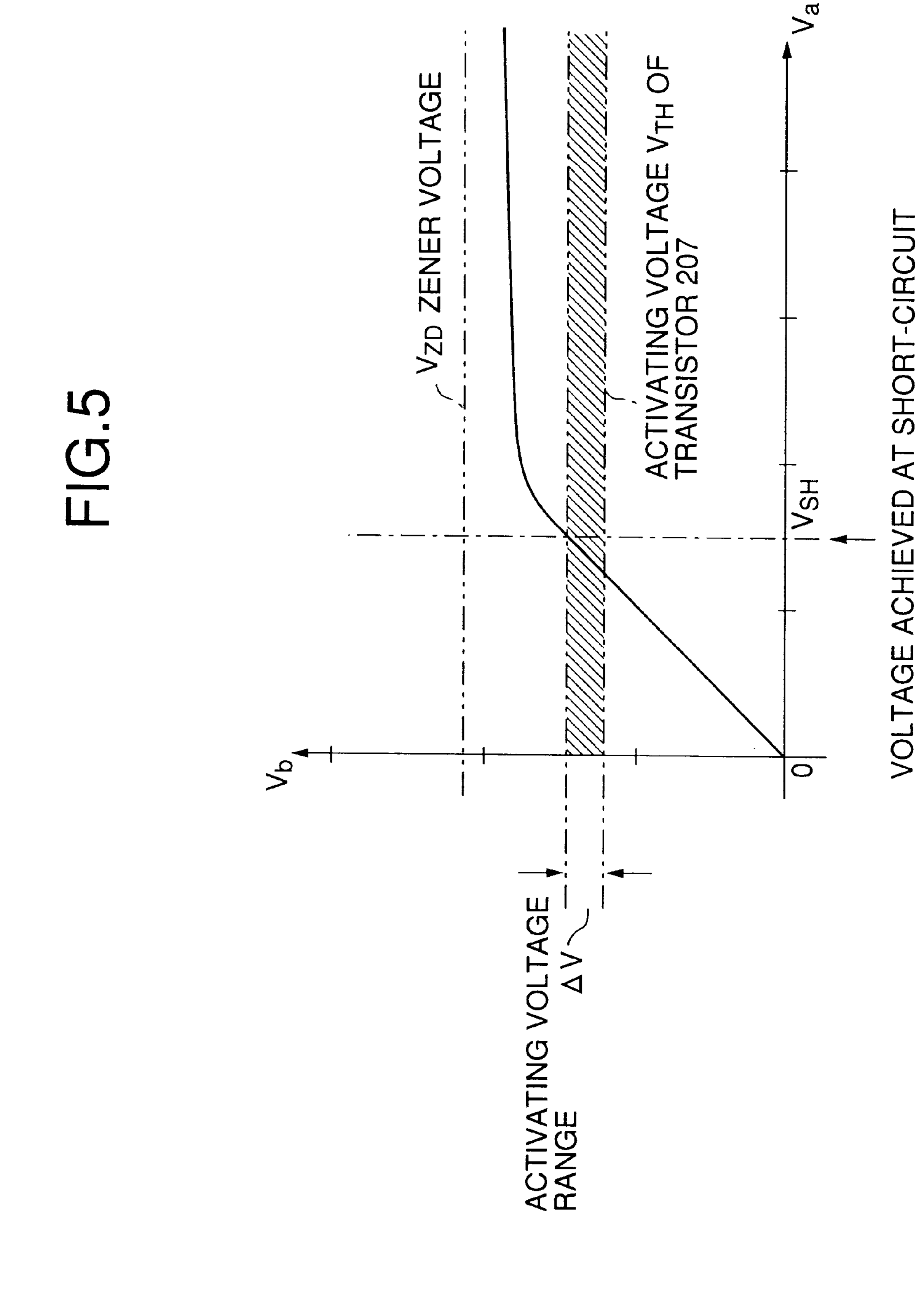
FIG. 5 is a graph showing an operation of the second embodiment.

Referring to FIG. 5, the activating voltage $V_{TH}$ of the NPN transistor 207 is set at a voltage level lower than the Zener voltage $V_{ZD}$ with a predetermined margin of ΔV.

In the case where no short circuit occurs, the voltage Va is generated depending on the output current flowing through the resistor 203 and is input to the base of the NPN transistor 207 as it is. Therefore, the voltage Vb increases in proportion to the voltage Va. When the voltage Vb reaches the activating voltage VTH of the NPN transistor 207, the NPN transistor 207 switches from OFF to ON, and thereby an input voltage $S_D$ of the set terminal S of the logic circuit 208 changes from HIGH to LOW.

On the other hand, when a short circuit occurs, a short-circuit current flows through the resistor 203, resulting in the voltage Va abruptly increasing to an achieved maximum voltage $V_{SH}$. Since the voltage Vb is proportional to Va, the NPN transistor 207 switches from OFF to ON when the voltage Vb exceeds the activating voltage $V_{TH}$, resulting in the set terminal S of the logic circuit 208 changing in voltage from HIGH to LOW. Therefore, when a short circuit occurs, the protection operation is promptly started.

The computer 14 performs the power supply control using the reset signal $S_R$ and the power supply control signal $S_S$ as described in the first embodiment.

Figure 6:
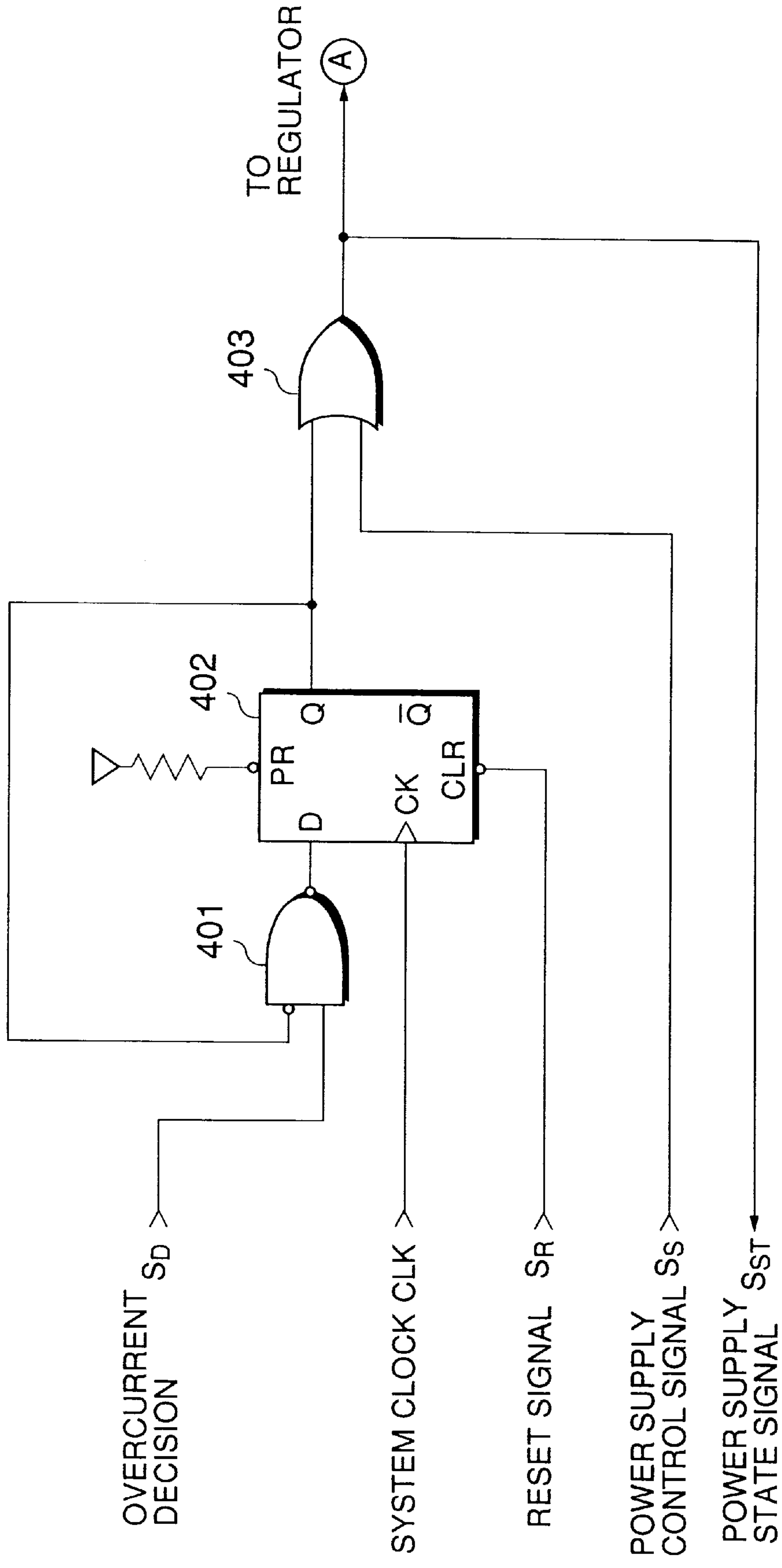
FIG. 6 is a circuit diagram showing an example of a power supply controller in the above embodiments.

FIG. 6 shows an example of the power supply controller 13. The power supply controller 13 is comprised of an AND gate 401, a D-flip-flop circuit 402 and an OR gate 403. The overcurrent decision signal $S_D$ is received at one input terminal of the AND gate 401 and the output 0 of the D-flip-flop 402 is input to the other input terminal of the AND gate 401. The output of the AND gate 401 is input to an input terminal D of the D-flip-flop 402. The D-flip-flop 402 operates according to a system clock CLK. When receiving the reset signal $S_R$ at the terminal CLR thereof, the D-flip-flop 402 is cleared or reset. The preset terminal PR is pulled up. In this example, PR and CLR are negative-true logic. The logic circuit 208 meeting the truth table as shown in Table I is formed with the AND gate 401 and the D-flip-flop 402 which are connected as shown in FIG. 6.

The OR gate 403 inputs the output Q of the D-flip-flop 402 and the power supply control signal $S_S$ and produces the logical OR thereof which is output to the control terminal ON/OFF of the regulator 202. In this example, the regulator 202 supplies power to the output power line when the output of the OR gate 403 is LOW and does not supply power when HIGH. The output of the OR gate 403 is also output as the power supply state signal $S_{ST}$ to the computer 14.

As described above, the computer 14 monitors the power supply state using the power supply state signal $S_{ST}$ at all times. Therefore, the computer can be promptly informed of power interruption and then perform alert operations using a monitor (not shown) or a speaker. This causes the operator to be prompted to take necessary recovery steps. When a cause of overcurrent has been removed, the computer 14 controls the power supply controller 13 using the reset signal $S_R$ and the power supply control signal $S_S$, so that the regulator 202 is restarted to supply power to the output power line promptly and reliably.

What is claimed is:

1. A power supplied circuit comprising:

a controllable power supply for supplying power to an output terminal;

detector means for detecting an output state of the controllable power supply;

determiner means for determining whether the output state falls into a predetermined range;

power supply controller means for controlling the controllable power supply such that the controllable power supply stops supplying power to the output terminal when the output state falls outside the predetermined range; and another controller means for controlling the power supply controller such that the controllable power supply starts supplying the power to the output terminal, wherein the detector means comprises:

a resistor for producing a voltage drop corresponding to an output current at the output terminal; and a first transistor for producing a detection signal responsive to the voltage drop, and the determiner means comprises:

a second transistor for producing a decision signal indicating whether the output state falls into the predetermined range; and a circuit for providing a bias to the second transistor so that the second transistor produces an overcurrent decision signal while receiving a detection signal which is greater than predetermined level from the first transistor.

2. The power supply circuit according to claim 1, wherein the another controller means controls the power supply controller means such that the power supply controller means stops controllable the controller power supply during a predetermined time period when the controllable power supply starts supplying the power to the output terminal.

3. The power supply circuit according to claim 1, wherein the power supply controller comprises:

a logic circuit for switching between a first state and a second state depending on whether the output state falls into the predetermined range, wherein the logic circuit is fixed to one of the first and second states when the controllable power supply starts supplying the power to the output terminal.

4. The power supply circuit according to claim 1, wherein the another controller means monitors an operation state of the controllable power supply by receiving a control signal for controlling the controllable power supply from the power supply controller means.

5. The power supply circuit according to claim 1, wherein the circuit comprises:

a resistor circuit through which the detection signal is input to a control electrode of the second transistor; and a capacitor connected to the resistor circuit to provide a predetermined time constant.

6. The power supply circuit according to claim 1, wherein the circuit comprises:

a resistor circuit through which the detection signal is input to a control electrode of the second transistor; and a Zener diode connected to the resistor circuit to protect the second transistor.

7. A power supply circuit comprising:

a controllable power supply for supply for supplying power to an output terminal;

determiner means for determining whether an output state of the controllable power supply falls into a predetermined range;

power supply controller means for controlling the controllable power supply such that the controllable power supply stops supplying the power to the output terminal when the output state falls outside the predetermined range; and computer means for outputting a control signal to the power supply controller means in response to the control signal which causes the controllable power supply to switch between a power-supplying off state and a power-supplying on state, wherein the determiner means comprises:

a resistor for producing a voltage drop corresponding to an output current at the output terminal;

a first transistor for producing a detection signal responsive to the voltage drop;

a second transistor for producing a decision signal indicating whether the output state falls into the predetermined range; and a circuit for providing a bias to the second transistor so that the second transistor produces an overcurrent decision signal while receiving the detection signal when it is greater than a predetermined level from the first transistor.

8. The power supply circuit according to claim 7, wherein the control signal comprises:

a power supply control signal for causing the controllable power supply to switch from the power-supplying off state to the power-supplying on state; and a reset signal for causing the power supply controller means to stop controlling the controllable power supply during a predetermined time period when the controllable power supply switches from the power-supplying off state to the power-supplying on state.

9. The power supply circuit according to claim 8, wherein the reset signal has precedence over the power supply control signal in the power supply controller means.

10. The power supply circuit according to claim 7, wherein the power supply controller comprises:

a logic circuit for switching between a first state and a second state depending on the control signal, wherein the logic circuit is fixed to one of the power supplying states when the controllable power supply means starts supplying the power to the output terminal.

11. The power supply circuit according to claim 7, wherein the circuit comprises:

a circuit including a resistor coupled to pass the detection signal to a control electrode of the second transistor; and a capacitor connected to the resistor circuit to provide a predetermined time constant.

12. The power supply circuit according to claim 7, wherein the circuit comprises:

a circuit including a resistor coupled to pass the detection signal to a control electrode of the second transistor; and a Zener diode connected to the resistor circuit to protect the second transistor.

* * * * *